Patented Jan. 2, 1940

2,185,972

UNITED STATES PATENT OFFICE 2,185,972

AROMATIC ARSONIC AND STIBONIC ACIDS

Max Bockmühl and Gustav Ehrhart, Frankfort-on-the-Main-Hochst, Germany, assignors to Winthrop Chemical Company, Inc., New York, N. Y., a corporation of New York No Drawing. Application November 3, 1936, Serial No. 109,060. In Germany November 9, 1935

5 Claims. (Cl. 260—443)

The present invention relates to aromatic arsonic and stibonic acids.

Aromatic arsenic and antimony compounds containing a radical comprising several hydroxyl groups are known. In these compounds the alkyl radical bearing the hydroxyl group is situated in an aromatically bound amino group. They are not of practical importance.

Now we have found that new arsenic and antimony compounds having a very good chemotherapeutic index may be obtained by linking the organic radical or radicals bearing the hydroxyl group in the form of acid amide radicals substituted at the nitrogen, with the aromatic rings bearing arsenic or antimony groups. The compounds thus obtainable have the following general formula:

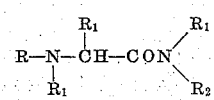

wherein R stands for a radical of the benzene series containing a substituent of the group consisting of the arsonic acid and stibonic acid radicals, $R_1$ stands for a member of the group consisting of hydrogen, alkyl, and lower hydroxyalkyl, and $R_2$ stands for an hydroxyalkyl having at least two hydroxyl groups and containing up to 6 carbon atoms.

The process may consist, for instance, in causing aromatic amines, phenols or aminophenols containing arsenic and/or antimony to react with halogen-acyl amides containing at the nitrogen one or two organic radicals having at least one hydroxyl group. Thus the phenylglycide-methylglucamide-para-arsonic acid is obtained from para-amino-phenyl-arsonic acid and chloracetyl-methylglucamide.

Similarly there are obtained from phenol-arsonic acids compounds in which the said acid amide radical is connected in an ether-like manner with the phenyl nucleus. By reduction of the arsonic acids or stibonic acids obtained according to this invention the corresponding arseno or stibio compounds may be obtained. The process may be applied with the same effect to other suitable arsenic and antimony compounds such as aromatic arseno or stibio compounds, furthermore to arsenoxides or stibin oxides, etc. The process may also consist in causing aromatic arsenic or antimony compounds having an exchangeable halogen atom to react with aminoacyl amides, having at the amide-nitrogen one or two organic radicals with one or more hydroxyl groups. It may be advantageous in this case to cause organic compounds free from arsenic or antimony and having an exchangeable halogen atom to react with the said aminoacyl amides and then to introduce an arsenic and/or antimony radical into the aromatic nucleus. Finally the process may be altered in such a manner that organic arsenic or antimony compounds having a glycine radical at the phenyl nucleus are condensed with aliphatic or alicyclic amines having one or more hydroxyl groups.

All the reaction products obtainable in this manner are white or nearly white powders which are readily soluble in water and char, when heated, without melting.

The following examples illustrate the invention:

(1) 21 grams of arsanilic acid dissolved in 50 cc. of water and 50 cc. of 2N-caustic soda solution are heated on a steam bath for about 2 hours with 27 grams of chloracetic acid methylglucamide. After cooling, the whole is filtered to a clear solution and then introduced, while stirring, into about 1 liter of absolute alcohol. The precipitated, nearly white powder is filtered with suction, dissolved in 40 cc. of water, filtered and allowed to stand in an ice box for several hours. The product is then again filtered to a clear solution and precipatated with methyl alcohol. The phenylglycide-methylglucamide-para-arsonic acid of the formula

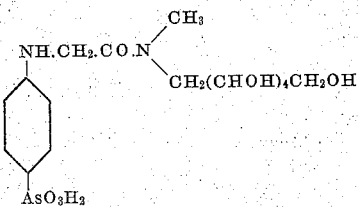

is obtained in the form of a white powder readily soluble in water.

By reduction of the phenylglycide-methylglucamide-para-arsonic acid with hydrosulfite or hydrophosphite the di-para-methylglucamideglycidearseno-benzene is obtained in the form of a light-yellow powder, readily soluble in water and easily obtainable in a pure form by dissolving it in water and precipitating it with methyl alcohol.

The N-chlor-acetyl N-methylglucamide is obtained as follows:

39 grams of methyl-glucamine are dissolved in 50 cc. of water (glucamine, ethyl-glucamine and othe glucamines may likewise be used) and 11.6 grams of chloracetyl chloride are added, while cooling. The mixture is shaken until the odor of chloracetyl chloride has disappeared. It is then dried in a vacuum and 200 cc. of methyl alcohol are added to the residue. On cooling, the methyl-glucamine hydrochloride crystallizes. The product is filtered with suction and the filtrate containing the N-chlor-acetyl N-methylglucamide is concentrated in a vacuum.

(2) 6 grams of the sodium salt of para-aminophenyl-stibonic acid are dissolved in 50 cc. of water and 6 grams of N-chlor-acetyl N-methylglucamide in 10 cc. of water are added; the whole is heated on a steam bath, then allowed to cool and filtered with suction to eliminate any aminophenyl-stibonic acid which may be separated; the clear filtrate is introduced into 200 cc. of methyl alcohol. The phenyl-glycide-methylglucamide-stibonic acid separates; it is filtered with suction and washed with methyl alcohol. By a further reprecipitation it is obtained in pure form. The phenyl-glycide-methyl-glucamide-stibonic acid of the formula

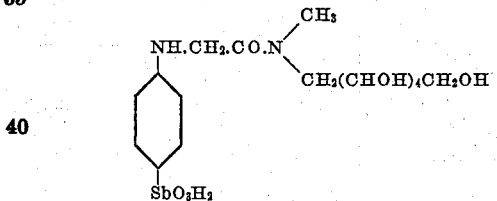

is readily soluble in water but sparingly soluble in alcohol. It decomposes at about 275° C.

(3) 23 grams of 3-amino-4-hydroxybenzene-arsonic acid are dissolved in 50 cc. of water with 50 cc. of 2N-caustic soda solution, the solution is filtered with carbon and heated for 2 hours on a steam bath with 27 grams of N-chlor-acetyl N-methylglucamide. The further treatment is as described in Example 1. The 4-hydroxy-3-methylglucamido-acetamino-benzene-1-arsonic acid of the formula

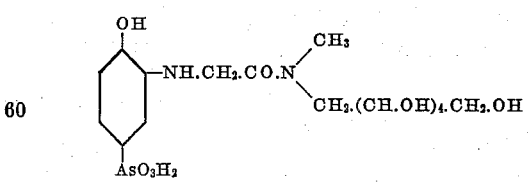

is a nearly white powder which is readily soluble in water when heated chars without melting.

With hypophosphorous acid or hydrosulfite there is obtained a water soluble arseno-benzene and with sulphur dioxide a readily water soluble arsenous oxide. By reduction common with other arsonic acids there are obtained asymmetrical arsenobenzenes.

(4) 24.5 grams of 3-methoxy-4-aminobenzene-1-arsonic acid are caused to react as described in Example 1 with 27 grams of N-chlor-acetyl N-methylglucamide. The compound thus obtainable has the formula

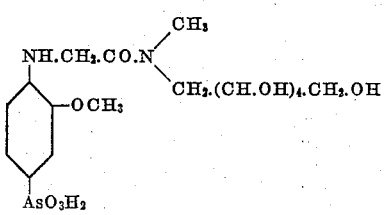

Its properties correspond with those of the substances described in the foregoing examples.

(5) 23 grams of 2-methyl-4-aminobenzene-1-arsonic acid are caused to react as described in the foregoing examples with 27 grams of N-chloracetyl N-methylglucamide. The compound obtained has the formula

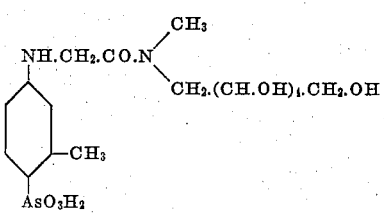

Its properties correspond with those of the substances described in the foregoing examples.

(6) 26 grams of 4-hydroxyethyl-aminobenzene-1-arsonic acid (prepared as described in "Journal of the American Chemical Society" 45, II, 2751) are caused to react as above described with 27 grams of N-chlor-acetyl N-methylglucamide. The compound obtained has the formula

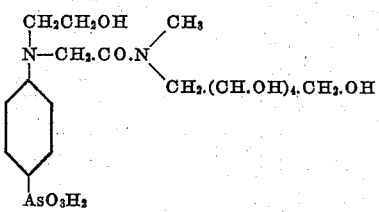

(7) 21 grams of arsanilic acid are caused to react with 33 grams of N-brom-propionyl N-methylglucamide. The latter is prepared by the action of bromopropionyl-bromide upon methylglucamine. There is obtained the compound of the formula

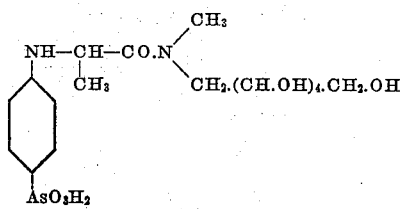

(8) 21 grams of arsanilic acid are caused to react with 31.5 grams of N-chlor-acetyl N-hydroxyethylglucamide. The latter is prepared by hydrogenation of the reaction product of glucose with beta-hydroxyethylamine and subsequent chloracetylation. There is obtained the compound of the formula

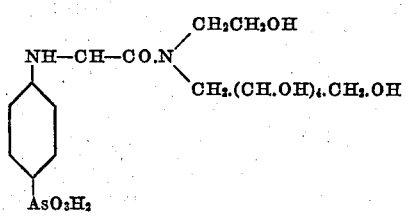

(9) 45 grams of para-glycine-methylesterbenzene-arsonic acid are introduced, while cooling, into 75 grams of 1-aminopropandiol-2,3 diluted with about the same quantity of water. The mixture is allowed to stand for 3 days at 40° C., whereby all the substances are dissolved. The solution is then rendered alkaline to phenolphtalein by addition of sodium hydroxide and the reaction product of the formula

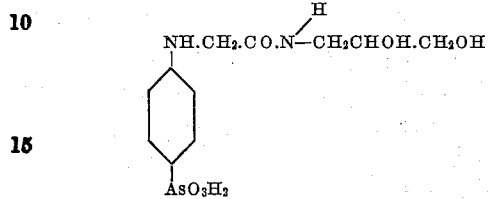

is separated by introduction into alcohol. At first it is obtained in the form of an oil, but becomes solid on decantation with alcohol.

(10) 29 grams of benzene-oxyacetic acid methyl-ester-para-arsonic acid prepared by the reaction of phenoxyacetic acid-para-arsonic acid esterification of the acid with methyl alcohol and concentrated sulfuric acid are caused to react as described in Example 9 with 50 grams of methylglucamine in 50 cc. of water. The reaction product of the formula

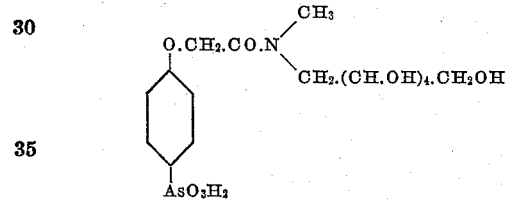

may be separated by introducing the solution into alcohol.

We claim:

1. Compounds of the following general formula:

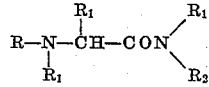

wherein R stands for a radical of the benzene series containing a substituent of the group consisting of the arsonic and stibonic acid radicals, $R_1$ stands for a member of the group consisting of hydrogen, alkyl and lower hydroxyalkyl, and $R_2$ stands for an hydroxyalkyl having at least two hydroxyl groups and containing up to 6 carbon atoms, said compounds being white powders readily soluble in water, sparingly soluble in alcohol and charring, when heated, without melting.

2. Compounds of the following general formula:

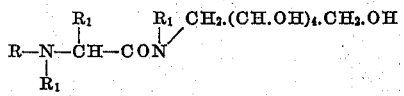

wherein R stands for a radical of the benzene series containing a substituent of the group consisting of the arsonic and stibonic acid radicals, and $R_1$ stands for a member of the group consisting of hydrogen, alkyl and lower hydroxyalkyl, said compounds being white powders readily soluble in water, sparingly soluble in alcohol and charring, when heated, without melting.

3. The compound of the following formula:

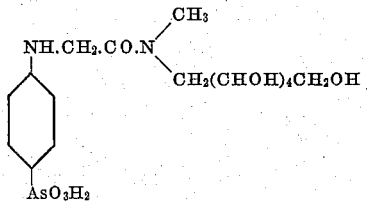

said compound being a white powder readily soluble in water, sparingly soluble in alcohol and charring, when heated, without melting.

4. The compound of the following formula:

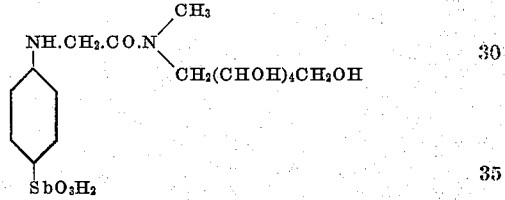

said compound being a white powder readily soluble in water, sparingly soluble in alcohol and charring, when heated, without melting.

5. The compound of the following formula:

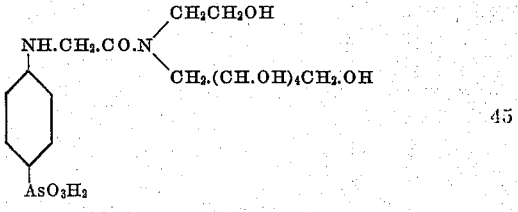

said compound being a white powder readily soluble in water, sparingly soluble in alcohol and charring, when heated, without melting.

MAX BOCKMÜHL.
GUSTAV EHRHART.